(12) United States Patent
Core (10) Patent No.: US 7,716,932 B2
(45) Date of Patent: May 18, 2010

(54) DILATING FAN DUCT NOZZLE (75) Inventor: Robert A. Core, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 0 days.

(21) Appl. No.: 12/178,856

(22) Filed: Jul. 24, 2008

(65) Prior Publication Data

US 2010/0018212 A1    Jan. 28, 2010

(51) Int. Cl.
F02K 1/00 (2006.01)

(52) U.S. Cl. ............... 60/771; 60/226.1; 239/265.33; 239/265.37

(58) Field of Classification Search ............. 60/226.1, 60/771; 239/265.33, 265.37
See application file for complete search history.

(56) References Cited

U.S. PATENT DOCUMENTS

| 3,875,742 | A | | 4/1975 | McMurtry et al. | |
|---|---|---|---|---|---|
| 5,110,050 | A | * | 5/1992 | Nightingale | ............ 239/265.39 |
| 6,318,070 | B1 | | 11/2001 | Rey et al. | |
| 6,487,848 | B2 | | 12/2002 | Zysman et al. | |
| 6,532,729 | B2 | | 3/2003 | Martens | |
| 6,543,224 | B1 | | 4/2003 | Barooah | |
| 6,718,752 | B2 | | 4/2004 | Nesbitt et al. | |
| 6,735,936 | B2 | | 5/2004 | Rey et al. | |
| 6,813,877 | B2 | | 11/2004 | Birch et al. | |
| 6,983,588 | B2 | | 1/2006 | Lair | |
| 7,000,378 | B2 | | 2/2006 | Birch et al. | |
| 7,004,047 | B2 | | 2/2006 | Rey et al. | |
| 7,093,423 | B2 | | 8/2006 | Gowda et al. | |
| 7,178,338 | B2 | | 2/2007 | Whurr | |
| 7,216,831 | B2 | | 5/2007 | Wood | |
| 7,458,221 | B1 | * | 12/2008 | Arnold et al. | ............... 60/771 |
| 2006/0213198 | A1 | * | 9/2006 | Arbona et al. | ............... 60/771 |
| 2007/0234728 | A1 | * | 10/2007 | Peters | ...................... 60/771 |
| 2008/0000235 | A1 | * | 1/2008 | Hanson | .................... 60/770 |
| 2008/0001039 | A1 | * | 1/2008 | Winter et al. | ............ 244/53 R |
| 2008/0092548 | A1 | * | 4/2008 | Morford et al. | ............... 60/771 |
| 2008/0190095 | A1 | * | 8/2008 | Baran | ..................... 60/226.3 |

* cited by examiner

Primary Examiner—Michael Cuff
Assistant Examiner—Phutthiwat Wongwian
(74) Attorney, Agent, or Firm—Hovey Williams LLP (57) ABSTRACT A turbofan engine includes an engine core and a ducted fan assembly, with the ducted fan assembly including an annular cowling and a dilating fan duct nozzle. The nozzle includes continuous nozzle sections with intermeshing tiles. The tiles include drive tiles that are pivotal between nominal and dilated positions and driven tiles that intermesh with the drive tiles and shift with the drive tiles between the positions. The intermeshing tiles cooperatively adjust an orifice size of the nozzle by shifting between the positions and thereby affect the thrust and noise developed by the ducted fan assembly.

16 Claims, 12 Drawing Sheets

DILATING FAN DUCT NOZZLE

BACKGROUND

1. Field

The present invention relates generally to nozzles for directing gas flow. More specifically, embodiments of the present invention concern a dilating nozzle for directing gas flow out of a jet engine.

2. Discussion of Prior Art

Conventional jet engines include a housing that directs air around the housing, directs air into the engine, and directs exhaust gas out of the engine. The housing normally includes an exhaust nozzle that defines an exit area of the engine and thereby affects the exhaust flow velocity out of the engine. Variable area exhaust nozzles are also known in the art and are operable to adjust the exhaust flow velocity and thereby change the engine thrust. Also, turbofan jet engines are known in the art and include a bypass fan that develops thrust.

Prior art exhaust nozzles are problematic and suffer from various undesirable limitations. For instance, prior art nozzles are insufficient at minimizing noise from gas turbine engines. Also, prior art turbofan engines are problematic because the bypass fan discharges air through a bypass duct and thereby generates significant noise. Prior art turbofan bypass ducts fail to adequately reduce turbofan noise and optimize propulsion performance.

SUMMARY

The present invention provides a dilating jet engine nozzle that does not suffer from the problems and limitations of the prior art jet engines and nozzles set forth above.

A first aspect of the present invention concerns a dilating jet engine nozzle operable to fluidly engage duct flow from a duct of a jet engine and direct the duct flow into ambient. The dilating jet engine nozzle is operable to be powered by a power source. The dilating jet engine nozzle broadly includes a bracket and a plurality of shiftable intermeshing tiles. The bracket is configured to be attached to the duct. The plurality of shiftable intermeshing tiles are supported by the bracket and circumferentially spaced to cooperatively form an arcuate continuous tiled nozzle section that at least partly defines an adjustably-sized nozzle orifice.

A second aspect of the present invention concerns a turbofan duct assembly operable to direct duct flow generated by a fan in a rearward direction into ambient and operable to be powered by a power source. The turbofan duct assembly broadly includes a fan duct and a dilating fan duct nozzle. The fan duct presents fore and aft ends. The fan duct is configured to surround the fan and extend rearwardly of the fan to the aft end, with the fan duct being operable to fluidly engage the duct flow. The dilating fan duct nozzle is operable to fluidly engage duct flow discharged from the fan duct. The dilating fan duct nozzle includes a bracket attached adjacent the aft end of the fan duct and a plurality of shiftable intermeshing tiles supported by the bracket. The tiles are circumferentially spaced to cooperatively form an arcuate continuous tiled nozzle section that at least partly defines an adjustably-sized nozzle orifice.

Other aspects and advantages of the present invention will be apparent from the following detailed description of the preferred embodiments and the accompanying drawing figures.

BRIEF DESCRIPTION OF THE DRAWING FIGURES

Preferred embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION OF THE PREFERRED EMBODIMENTS

Figure 1:
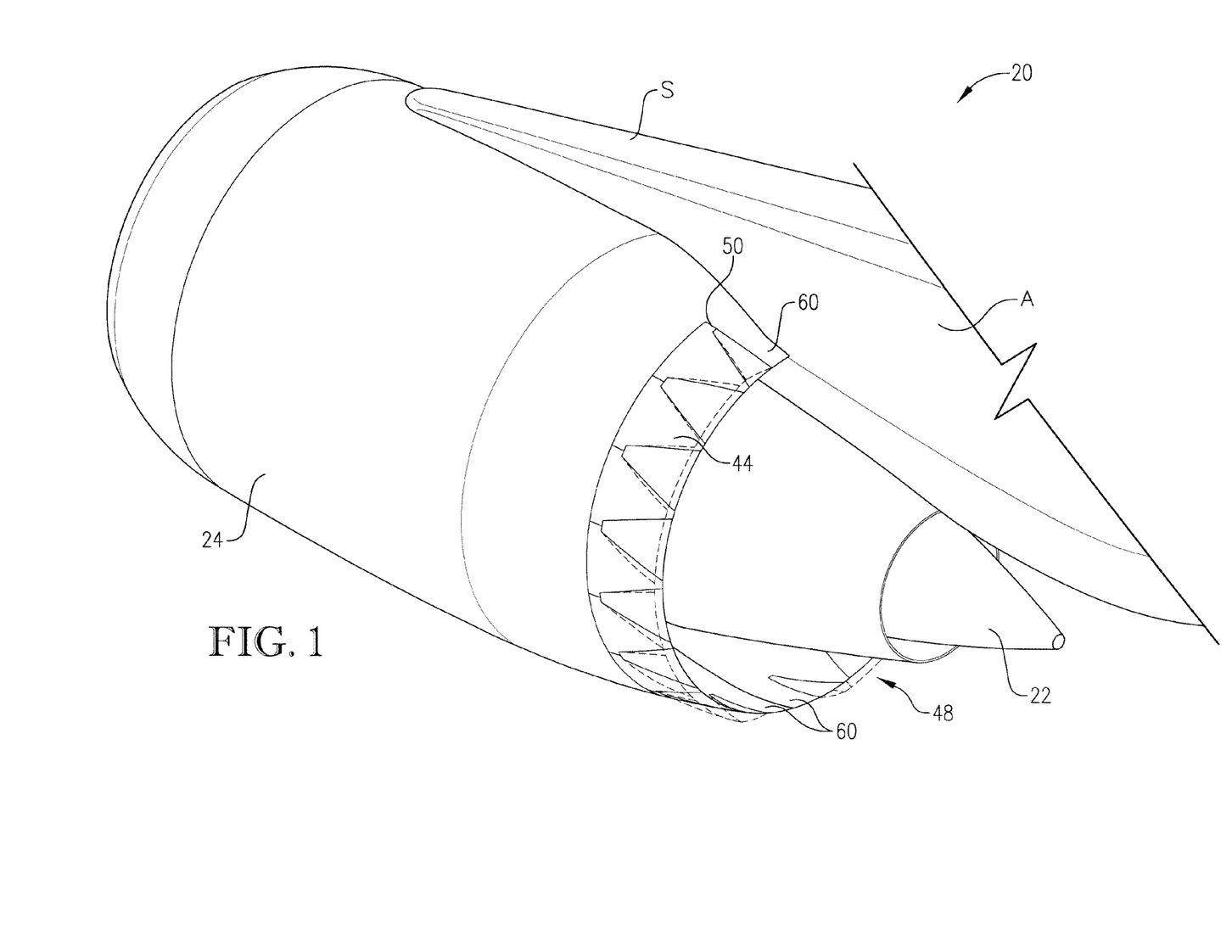
FIG. 1 is a fragmentary perspective view of a jet aircraft with a turbofan jet engine constructed in accordance with a first preferred embodiment of the present invention and showing nozzle sections of the engine in nominal and dilated configurations.

Turning initially to FIG. 1, a turbofan engine 20 is illustrated. A turbofan engine is a gas turbine engine that is operable to provide thrust for a jet aircraft A. Although the illustrated turbofan engine 20 is preferred, the principles of the present invention are applicable where other types of gas turbine engines, e.g., turbojet or turboprop, are used. The turbofan engine 20 broadly includes an engine core 22 and a ducted fan assembly 24.

Figure 2:
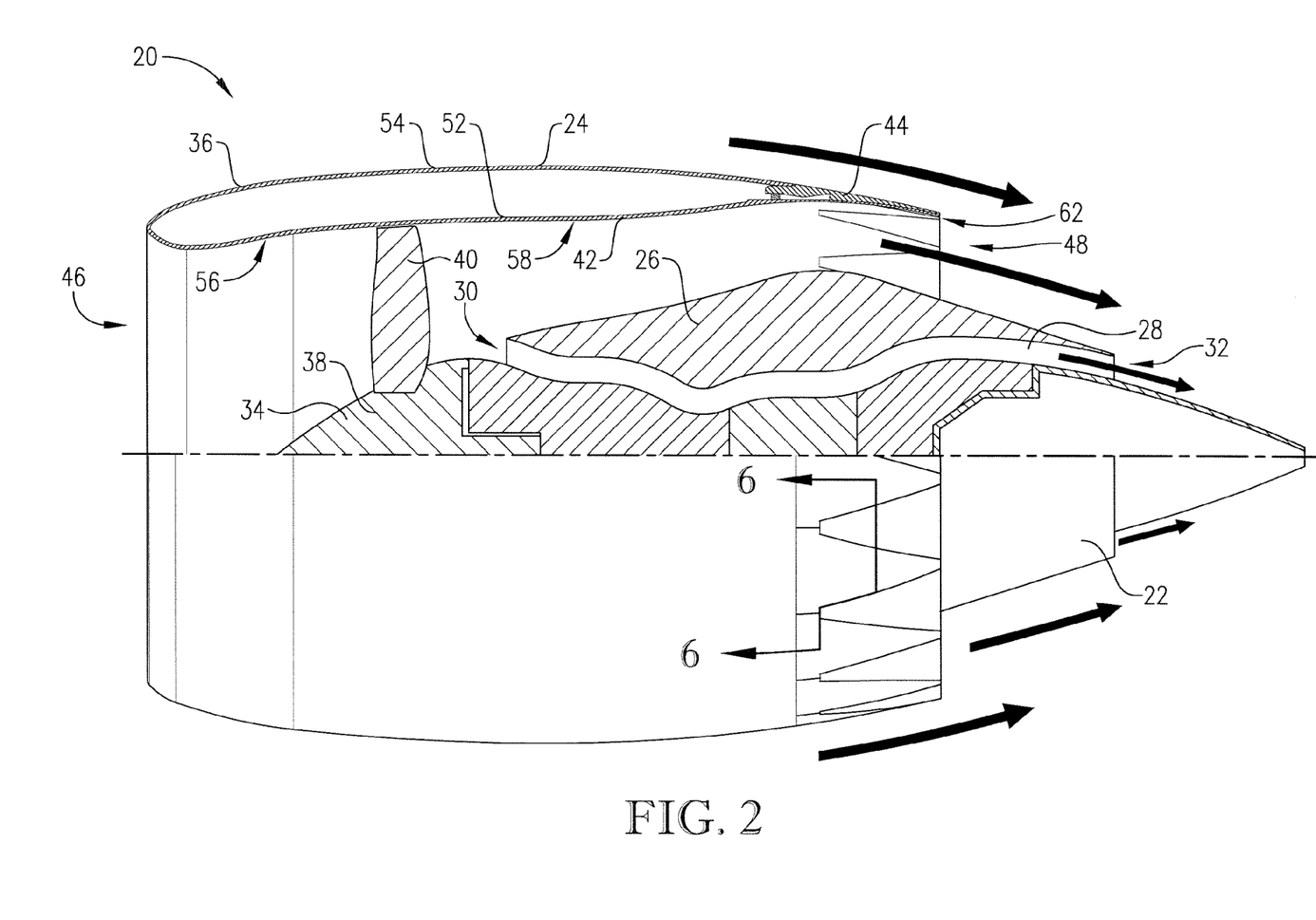
FIG. 2 is a partial cross-sectional view of the turbofan jet engine shown in FIG. 1, showing an engine core and a ducted fan assembly, with the ducted fan assembly including a ducted fan housing, and with the ducted fan housing including an annular cowling and the nozzle sections attached to an aft end of the annular cowling.
Figure 3:
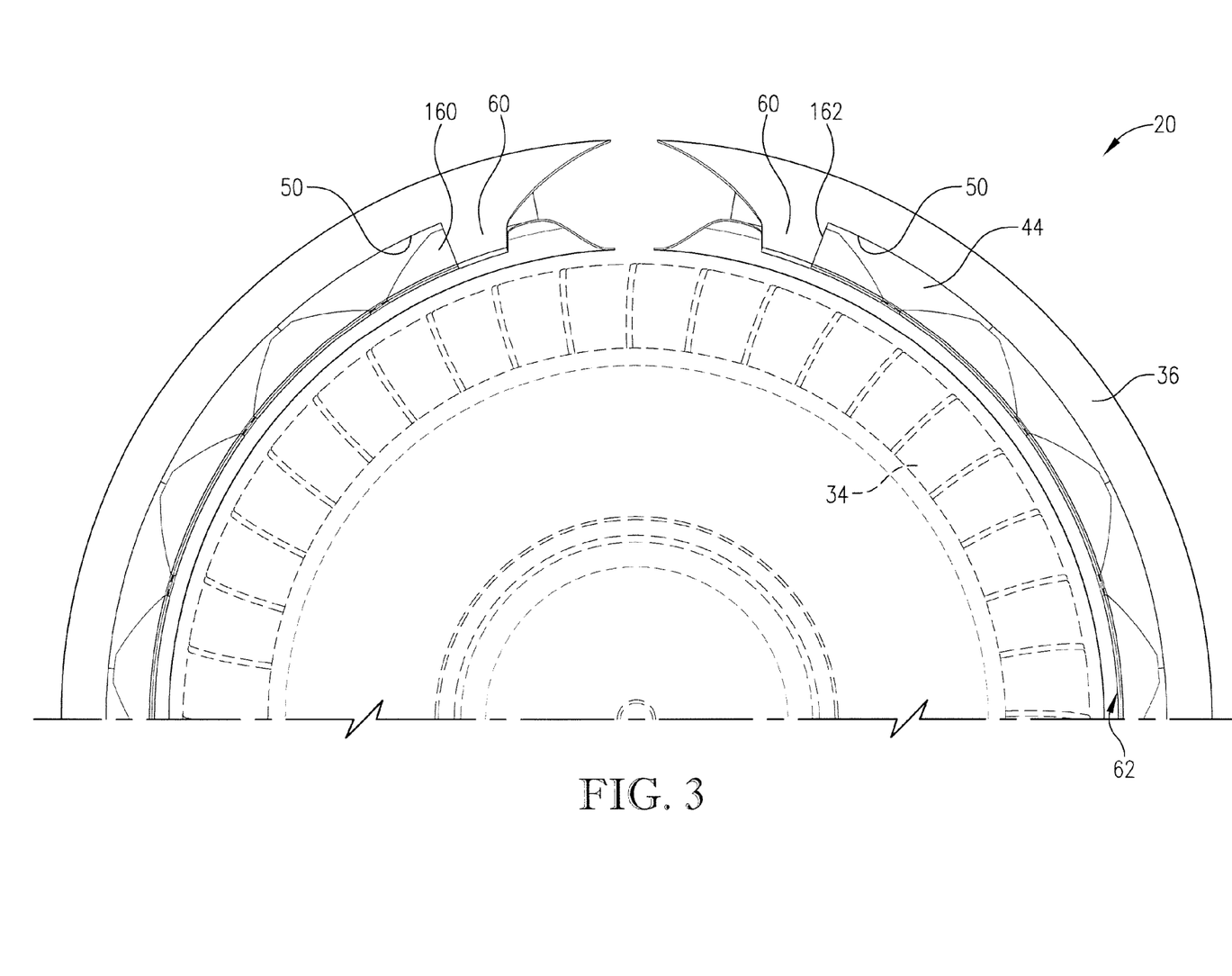
FIG. 3 is a fragmentary rear elevational view of the turbofan jet engine shown in FIGS. 1 and 2.
Figure 4:
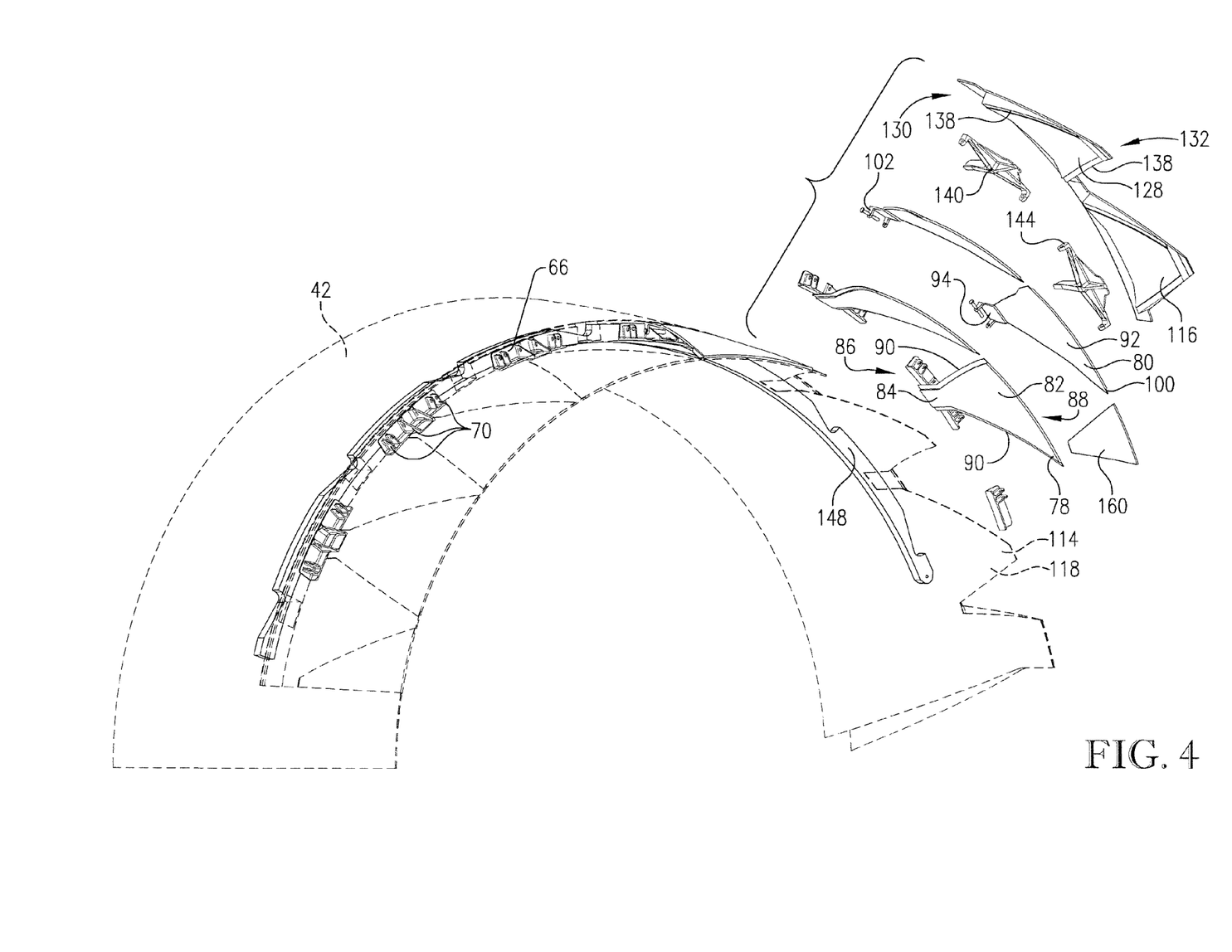
FIG. 4 is a partly exploded fragmentary view of the ducted fan housing shown in FIGS. 1-3, showing the nozzle section with some of the drive tiles, driven tiles, and tile brackets being exploded away from the nozzle section.

Turning to FIGS. 1-3, the engine core 22 is coupled to a strut S of the jet aircraft A and operates in a manner similar to a turbojet. However, the engine core 22 serves to power the ducted fan assembly 24, as will be discussed in greater detail. The engine core 22 includes a housing 26 that partly defines a flow path 28. In the usual manner, the engine core 22 also includes a compressor (not shown), a combustion assembly (not shown), and a turbine (not shown) that are spaced along the flow path 28. Thus, ambient air is drawn into an inlet 30 of the flow path 28 by the compressor. The compressed air is introduced into the combustion assembly and provides oxygen for combustion of fuel that is also introduced into the combustion assembly. Exhaust flow from the combustion assembly drives the turbine and exits the flow path 28 through outlet 32. The engine core 22 also includes a drive shaft (not shown) that is drivingly coupled with the turbine of the engine core 22 and is drivingly attached to the ducted fan assembly 24, as will be discussed, to transmit power from the engine core 22 to the ducted fan assembly 24.

The ducted fan assembly 24 broadly includes a fan 34 and a ducted fan housing 36. The fan 34 includes a hub 38 and a plurality of fan blades 40 spaced about and attached to the hub 38 in the usual manner. The fan 34 is drivingly attached to the engine core 22 by attaching the drive shaft of the engine core 22 to the hub 38. Thus, the turbine of the engine core 22 rotates and thereby causes the fan 34 to rotate and create thrust.

The ducted fan housing 36 surrounds the fan 34 and further enables the fan 34 to provide thrust. In particular, the ducted fan housing 36 includes an annular cowling 42 and dilating fan duct nozzle sections 44. The annular cowling 42 presents an inlet end 46 and a nozzle end 48. Along the nozzle end 48, the annular cowling 42 preferably presents a pair of recesses 50 that receive the nozzle sections 44. However, the annular cowling 42 could be alternatively configured to present an alternative number of recesses 50 for receiving nozzle sections 44. The annular cowling 42 includes inner and outer arcuate panels 52,54 that extend between the inlet end 46 and the nozzle end 48. The annular cowling 42 is attached to the strut S that is coupled to the engine core 22 and restricts relative movement between the annular cowling 42 and the engine core 22. The ducted fan housing 36 forms an inlet duct 56 that extends from the inlet end 46 and rotatably receives the fan 34. Also, the inner panel 52 and the housing 26 cooperatively form a bypass duct 58 that extends in an aft direction from and fluidly communicates with the inlet duct 56. In the usual manner, the bypass duct 58 is operable to discharge some of the air from the inlet duct 56. Thus, ambient air is drawn into the inlet duct 56 by the fan 34, with some of the air being received by the engine core 22 and a remainder of the air being discharged into the bypass duct 58 and through the nozzle end 48.

The nozzle sections 44 serve to control the flow of fan exhaust into the external flow of air and thereby affect thrust and noise produced by the turbofan 20. The illustrated nozzle sections 44 are each received by a corresponding one of the recesses 50. The nozzle sections 44 and adjacent portions 60 of the annular cowling 42 cooperatively form a nozzle with a nozzle orifice 62. However, the principles of the present invention are also applicable where the annular cowling 42 does not form part of the nozzle. As will be discussed in greater detail, each nozzle section 44 has a combination of intermeshing tiles that extend continuously and cooperatively form a geodesic division of the nozzle surface. The intermeshing tiles also cooperatively permit the nozzle to shift between nominal and dilated configurations and thereby control the fan exhaust flow (see FIG. 1). However, it is also within the ambit of the present invention where the nozzle includes an alternative number of dilating fan duct nozzle sections 44, e.g., a single dilating fan duct nozzle section. Furthermore, for some aspects of the present invention, the nozzle could include an endless dilating fan duct nozzle section.

Figure 7:
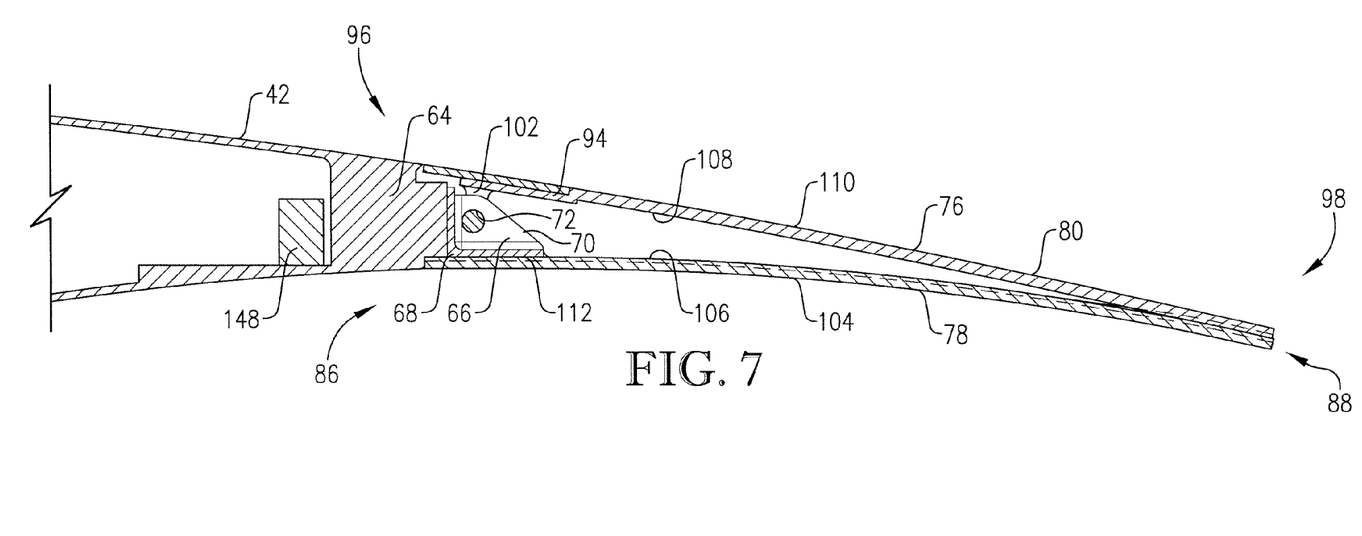
FIG. 7 is a fragmentary cross-sectional view, taken in a circumferential direction, of the ducted fan housing shown in FIGS. 1-5, showing the driven tiles in a radially innermost nominal tile position.
Figure 8:
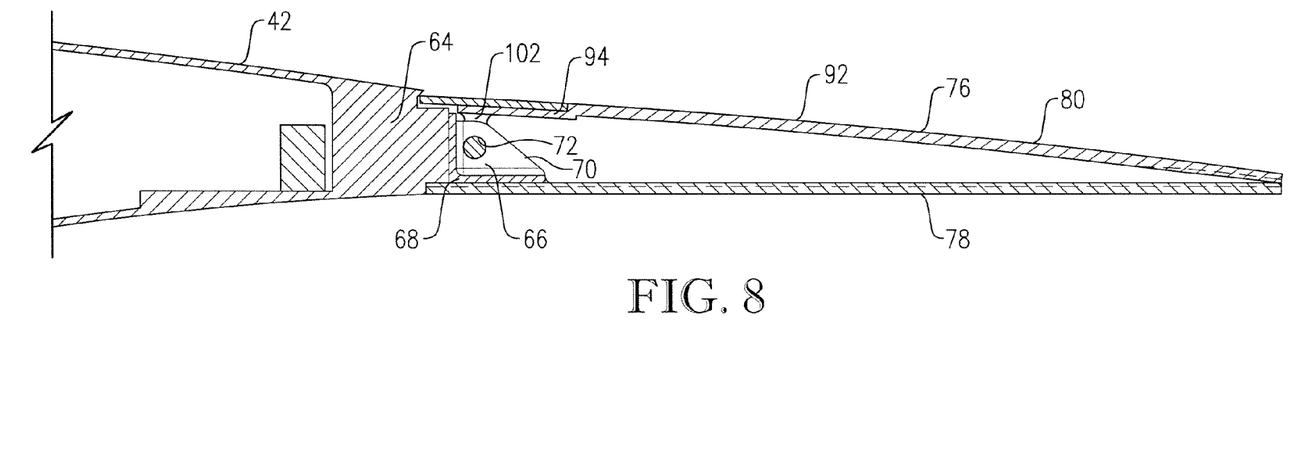
FIG. 8 is a fragmentary cross-sectional view, taken in a circumferential direction, of the ducted fan housing shown in FIGS. 1-5 and 7, showing the driven tiles in a radially outermost dilated tile position.

Turning to FIGS. 4-12, the nozzle sections 44 are attached to an annular bulkhead 64 of the annular cowling 42 (see FIGS. 7 and 8). The nozzle sections 44 preferably include a plurality of brackets 66 that are spaced circumferentially along and fixed to the annular bulkhead 64. Each bracket 66 is preferably unitary and includes an L-shaped body 68 and gussets 70. Pairs of gussets 70 are positioned adjacent opposite ends of the body 68, with a third pair of gussets 70 spaced centrally along the length of the body 68. The gussets 70 present holes 72 for pivotally receiving tiles as will be discussed further. While the plurality of brackets 66 are preferable for pivotally supporting the nozzle sections 44, it is also within the ambit of the present invention where the nozzle sections 44 are alternatively supported for shiftable movement relative to the annular cowling 42.

The nozzle sections 44 each include a plurality of drive tiles 74 and a plurality of driven tiles 76 that intermesh with one another as will be discussed in greater detail. The driven tiles 76 each include inner and outer driven tile sections 78,80. The inner driven tile sections 78 each preferably include a generally trapezoidal shaped body 82 and a tab 84, with each section 78 including fore and aft ends 86,88, and with a width of the body 82 tapering toward the tab 84 to form the trapezoidal shape. The body 82 and tab 84 cooperatively present stepped side ledges 90 that extend between the ends 86,88. The outer driven tile sections 80 also preferably include a generally trapezoidal shaped body 92 and a tab 94, with each section 80 including fore and aft ends 96,98, and with a width of the body 92 tapering toward the tab 94 to form the trapezoidal shape. The body 92 presents stepped side ledges 100 that extend between the ends 96,98. The outer driven tile section 80 also includes hinge arms 102 that are attached to the tab 94. It is also within the ambit of the present invention where the body 82 or the body 92 presents another shape, such as a trapezoid that tapers away from the tab 84, or a substantially triangular shape. The inner driven tile section 78 is normally arcuately shaped to present radially inner and outer surfaces 104,106 (see FIG. 7) that are concave and convex, respectively. The outer driven tile section 80 is also normally arcuately shaped to present radially inner and outer surfaces 108,110 (see FIG. 7) that are concave and convex, respectively. However, it is also within the scope of the present invention where the sections 78,80 present surfaces that are flat or have an alternative shape. Also, while the driven tiles 76 preferably include the sections 78,80, it is within the scope of the present invention where the driven tiles 76 are unitary or are otherwise alternatively configured so as to intermesh with adjacent drive tiles 74 as will be discussed.

Each of the sections 78,80 are preferably attached to a respective one of the brackets 66. More specifically, the tab 84 of the inner driven tile section 78 is attached to a lower side 112 of the bracket 66, with the body 82 being cantilevered in the aft direction away from the bracket 66. The hinge arms 102 of the outer driven tile section 80 are pivotally attached to centrally positioned gussets 70 with pins so that the outer driven tile section 80 is preferably operable to pivot relative to the respective bracket 66. However, the principles of the present invention are applicable where the section 80 is alternatively attached relative to the bracket 66 and the section 78, e.g., the section 80 could be directly attached to the section 78. Furthermore, the section 78 could be alternatively attached relative to the bracket 66.

The sections 78,80 are shiftable so that the driven tiles 76 can shift between a radially innermost nominal position and a radially outermost dilated position. The sections 78,80 slidably engage one another adjacent the aft ends 88,98 as the driven tiles 76 shift between the positions.

Figure 11:
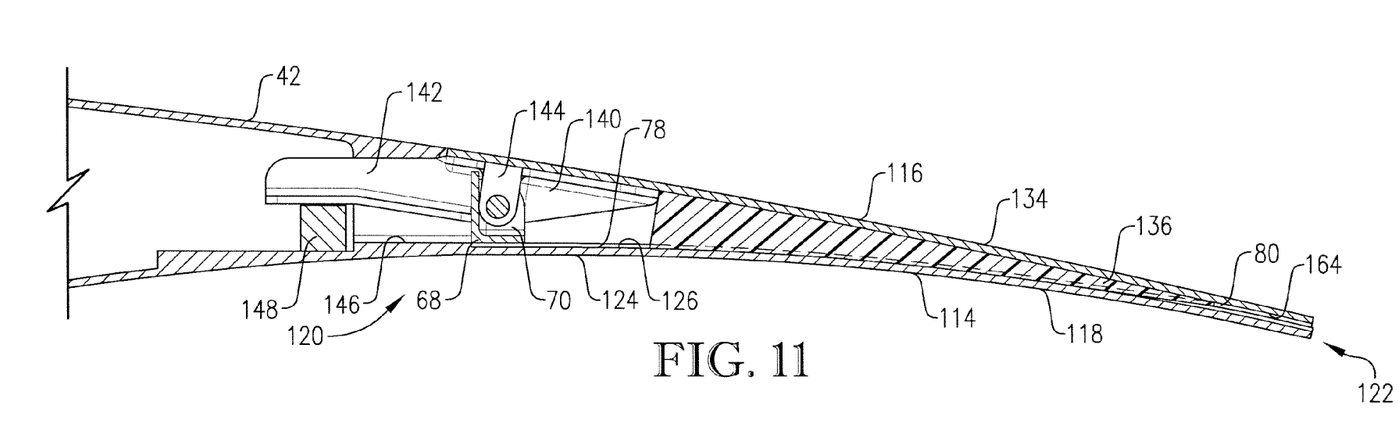
FIG. 11 is a fragmentary cross-sectional view, taken in a circumferential direction, of the ducted fan housing shown in FIGS. 1-5, 7, and 8, showing the drive and driven tiles in the nominal tile position.
Figure 12:
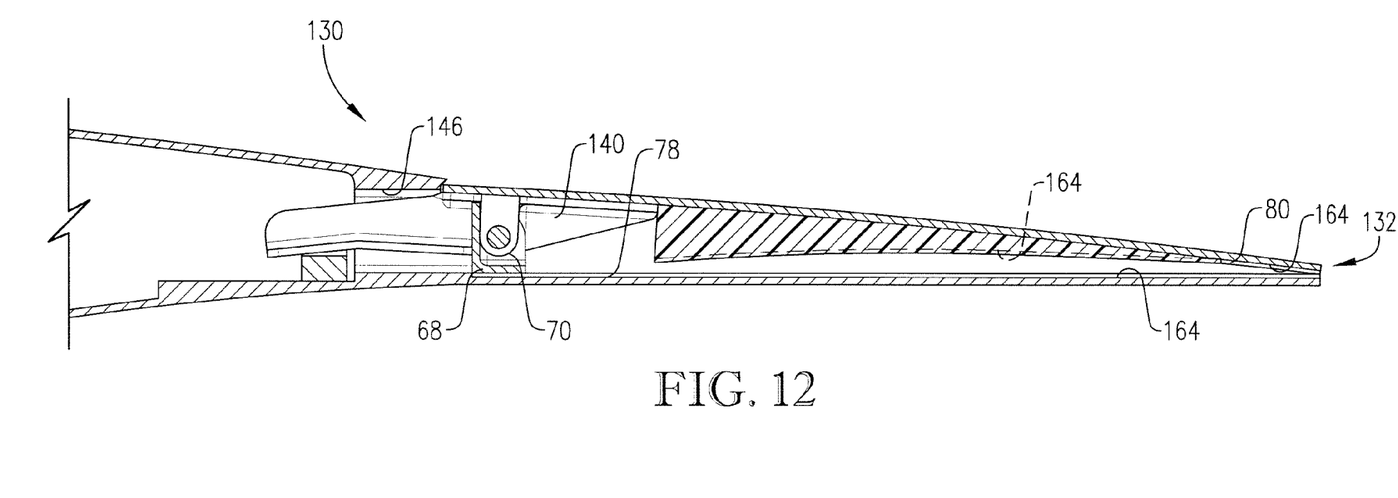
FIG. 12 is a fragmentary cross-sectional view, taken in a circumferential direction, of the ducted fan housing shown in FIGS. 1-5 and 7, 8, and 11, showing the drive and driven tiles in the dilated tile position.

Each of the drive tiles 74 include inner and outer drive tile sections 114,116 (see FIG. 11). The inner drive tile sections 114 each preferably include a generally trapezoidal shaped body 118, with each section 114 including fore and aft ends 120,122, and with a width of the body 118 tapering in the aft direction to form the trapezoidal shape. However, the sections 114 could have a different shape without departing from the scope of the present invention. The inner drive tile sections 114 are normally arcuately shaped to present radially inner and outer surfaces 124,126 that are concave and convex, respectively. However, it is also within the scope of the present invention where the sections 114 present surfaces that are flat or have an alternative shape. The inner drive tile sections 114 are preferably integrally formed with the inner panel 52, but could be separate from the inner panel 52 without departing from the scope of the present invention.

The outer drive tile sections 116 each include a generally trapezoidal shaped body 128, with each section 116 including fore and aft ends 130,132, and with a width of the body 128 tapering in the aft direction to form the trapezoidal shape. However, the sections 114 could have a different shape without departing from the scope of the present invention. The body 128 includes a flat portion 134 and a wedge portion 136 that are preferably fixed to one another. Thus, the portions 134,136 cooperate so that the body 128 has a thickness that tapers from the fore end 130 toward the aft end 132. The body 128 presents an outer surface 139 that is preferably normally convex. The body 128 also presents stepped side ledges 138 that extend between the ends 130,132.

Yet further, the outer drive tile sections 116 each include a tile lever 140 with an elongated lever arm 142 and opposite hinge elements 144 that extend transversely to the lever arm 142. The tile lever 140 is attached to the flat portion 134 of the body 128 adjacent the fore end 130, with the lever arm 142 projecting away from the body 128.

The outer drive tile sections 116 are pivotally attached to respective brackets 66 by attaching the hinge elements 144 to corresponding pairs of gussets 70 with pins. The tile lever 140 extends through an opening 146 in the annular bulkhead 64 and into the annular cowling 42. The drive tile sections 114, 116 are shiftable so that the drive tiles 74 can shift between a radially innermost nominal position and a radially outermost dilated position. The sections 114,116 slide relative to one another adjacent the aft ends 122,132 as the drive tiles 74 shift between the positions. The inner drive tile sections 114 are integrally formed with the inner panel 52 so as to be biased into the dilated position. In other words, the inner drive tile sections 114 are preferably spring loaded in the nominal position to urge the drive tiles 74 from the nominal position to the dilated position. However, it is also within the scope of the present invention where the sections 114 are not spring loaded in the nominal position. Furthermore, the nominal position of the drive tile sections 114,116 could be a radially outermost position, with the drive tile sections 114,116 being biased to shift radially inwardly from the radially outermost position.

Figure 5:
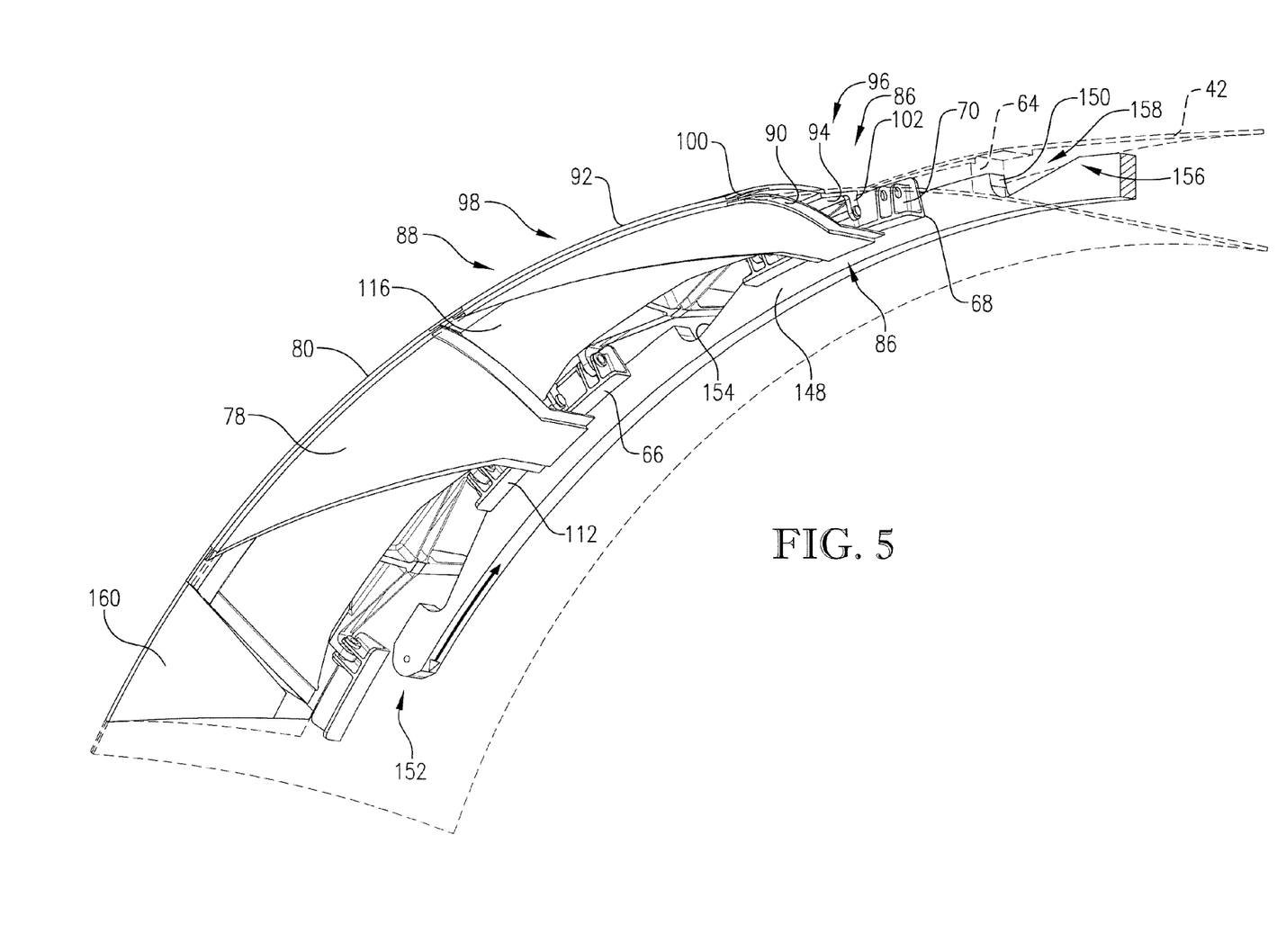
FIG. 5 is an enlarged fragmentary view of the ducted fan housing shown in FIGS. 1-4, with portions of the drive tiles removed.
Figure 6:
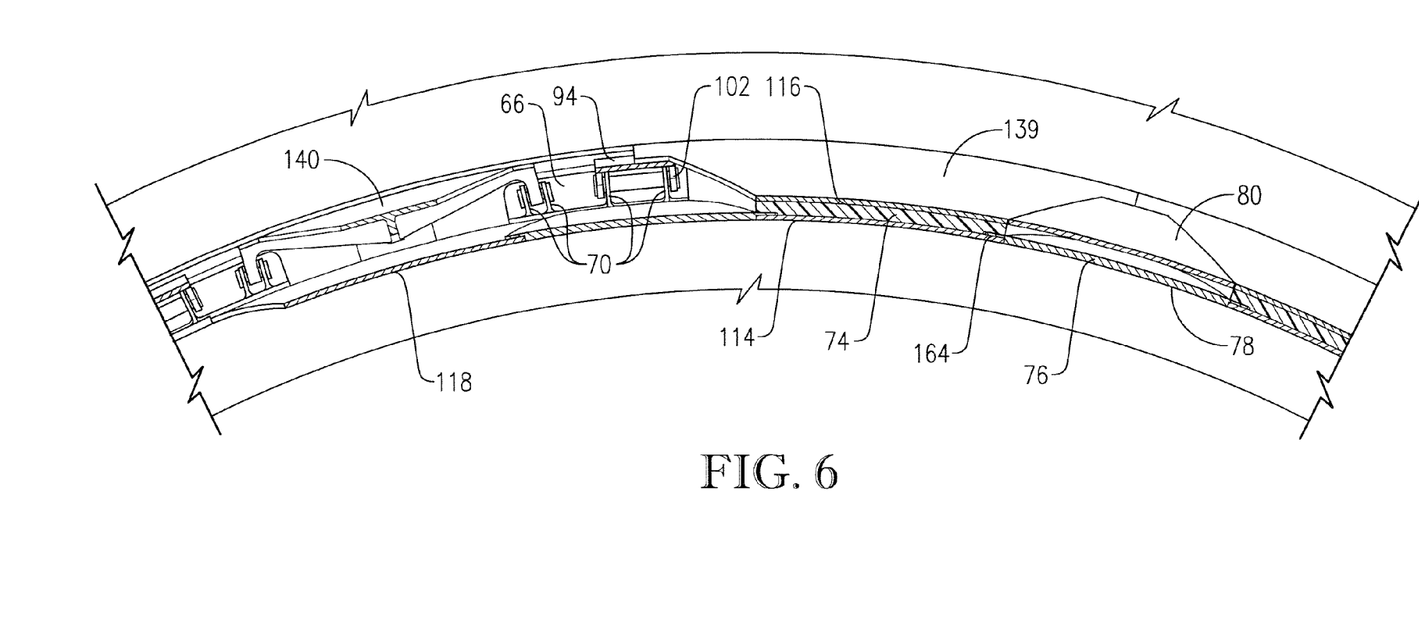
FIG. 6 is a cross-sectional view of the dilating fan duct nozzle taken along line 6-6 in FIG. 2.

Each nozzle section 44 also includes, as is perhaps best shown in FIG. 5, an annular cam 148 that is rotatably received adjacent the annular bulkhead 64 for shifting the drive tiles 74 between the positions. The annular cam 148 presents a cam surface 150 and an actuation end 152 that is operable to be driven by a power source (not shown), such as a hydraulic cylinder or electric motor. The cam surface 150 includes ramp segments 154 that engage respective tile levers 140. The annular cam 148 is preferably received within the annular cowling 42 and is shiftable in a circumferential direction relative to the annular cowling 42.

In a first circumferential position, the tile levers 140 are each positioned between a raised end 156 and a recessed end 158 of the ramp segments 154, with the drive tiles 74 being in the nominal position. In a second circumferential position spaced from the first circumferential position, the annular cam 148 is positioned so that the tile levers 140 are each received adjacent the recessed end 158 of the ramp segments 154. Again, the drive tiles 74 are normally biased from the nominal position to the dilated position because the inner drive tile section 114 urges the drive tile 74 in a radially outward direction from the nominal position to the dilated position. Therefore, with the annular cam 148 in the second circumferential position, the drive tiles 74 are permitted to shift into the dilated position. Similarly, the annular cam 148 is operable to return the drive tiles 74 from the dilated position to the nominal position by shifting the annular cam 148 from the second circumferential position to the first circumferential position.

As previously mentioned, the drive and driven tiles 74,76 are positioned in alternating fashion in a circumferential direction and intermesh with one another to form nozzle sections 40. Each nozzle section 44 further includes end tiles 160 that are similar to the driven tiles 76 in that each end tile 160 intermeshes with an adjacent drive tile 74 and is driven by the adjacent drive tile 74. However, the end tiles 160 each present a side edge 162 operable to remain next to an adjacent edge of the annular cowling 42 while an opposite side edge moves with the drive tile 74. The end tiles 160 could be alternatively configured to provide a different transition between the adjacent drive tile 74 and the adjacent edge of the annular cowling 42 without departing from the scope of the present invention.

Each drive tile 74 presents grooves 164 that are cooperatively formed by the inner and outer drive tile sections 114, 116. Each driven tile 76 is received by corresponding grooves 164, i.e., the stepped side ledges 90,100 are received therein, so that the drive and driven tiles 74,76 move with one another as the drive tiles 74 arc shifted between the nominal and dilated positions. However, the drive tiles 74 could each be received within the adjacent driven tiles 76 without departing from the scope of the present invention. The illustrated drive tiles 74 are configured to be relatively more rigid than the driven tiles 76 so that the driven tiles 76 conform to the position of the drive tiles 74. Thus, movement of the drive tiles 74 causes the nozzle to shift between corresponding nominal and dilated configurations. However, it is also within the scope of the present invention where the driven tiles 76 and driven tiles 74 have about the same rigidity.

Figures 9, 10:
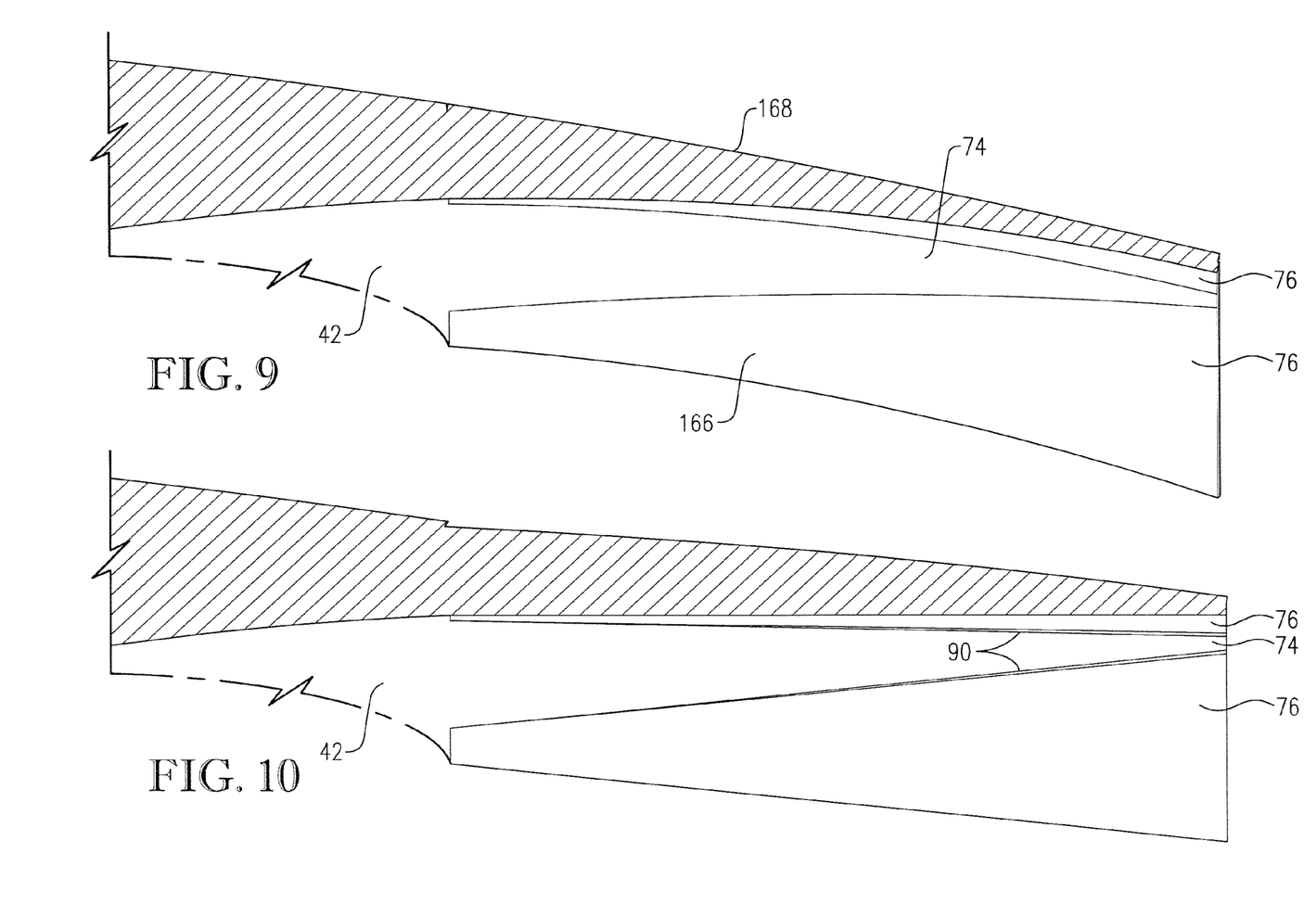
FIG. 9 is a fragmentary schematic cross-sectional view of the ducted fan housing shown in FIGS. 1-5, 7, and 8, showing the drive and driven tiles in the nominal tile position.
FIG. 10 is a fragmentary schematic cross-sectional view of the ducted fan housing shown in FIGS. 1-5 and 7-9, showing the drive tiles in the dilated tile position, with the adjacent tiles being shifted circumferentially away from each other relative to the nominal tile position.

In the nominal configuration, the drive and driven tiles 74,76 are positioned in the radially innermost nominal positions, with the driven tiles 76 being received within respective drive tiles 74, and with substantially maximum overlap between adjacent tiles 74,76 (see FIG. 9). Thus in the nominal configuration, the nozzle orifice 62 is contracted to have a substantially minimum nozzle area. In the dilated configuration, the drive and driven tiles 74,76 are positioned in the radially outermost nominal positions, with the driven tiles 76 being received within respective drive tiles 74, and with substantially minimum overlap between adjacent tiles 74,76 (see FIG. 10). Thus in the dilated configuration, the nozzle orifice 62 is expanded to have a substantially maximum nozzle area. Preferably, the maximum nozzle area is in the range of about 10-20 percent larger than the minimum nozzle area. However, it is also within the scope of the present invention where the maximum nozzle area is less than 10 percent or greater than 20 percent of the minimum nozzle area.

The drive and driven tiles 74,76 also preferably cooperatively present substantially continuous inner and outer tiled surfaces 166,168, with the tiles 74,76 being arranged to give the surfaces 166,168 a geodesic division. In particular, inner tiled surface 166 is cooperatively formed by the inner surfaces 104,124. The outer tiled surface 168 is cooperatively formed by the outer surfaces 110,139. The tiled surfaces 166,168 preferably remain substantially continuous as the nozzle shifts between the configurations.

In operation, the nozzle sections 44 are operable to control the nozzle orifice size as the aircraft A is operated in different flight regimes. The nozzle sections 44 are normally operated in the nominal configuration with the tiles 74,76 in the radially innermost nominal positions (see FIG. 9). When it is necessary to expand the nozzle orifice 62, the annular cams 148 are shifted by the power source in a first circumferential direction so that the tile levers 140 are permitted to slide downwardly along the respective ramp segments 154. Consequently, the tiles 74,76 shift simultaneously into dilated positions so that the nozzle sections 44 are in the dilated configuration and the nozzle orifice 62 is expanded to present the maximum nozzle area (see FIG. 10). The annular cams 148 are shiftable by the power source in a second circumferential direction opposite to the first circumferential direction so that the tile levers 140 are forced to slide upwardly along the respective ramp segments 154. Consequently, the tiles 74,76 shift simultaneously back into the nominal positions so that the nozzle sections 44 are in the dilated configuration and the nozzle orifice 62 is contracted to present the minimum nozzle area. Furthermore, the tiles 74,76 can be shifted to any position intermediate the nominal and dilated positions to provide a predetermined size of the nozzle orifice 62.

Turning to FIGS. 13-18, alternative embodiments of the present invention are depicted. For the sake of brevity, the remaining description will focus primarily on the differences of these alternative embodiments from the preferred embodiment described above.

Figure 13:
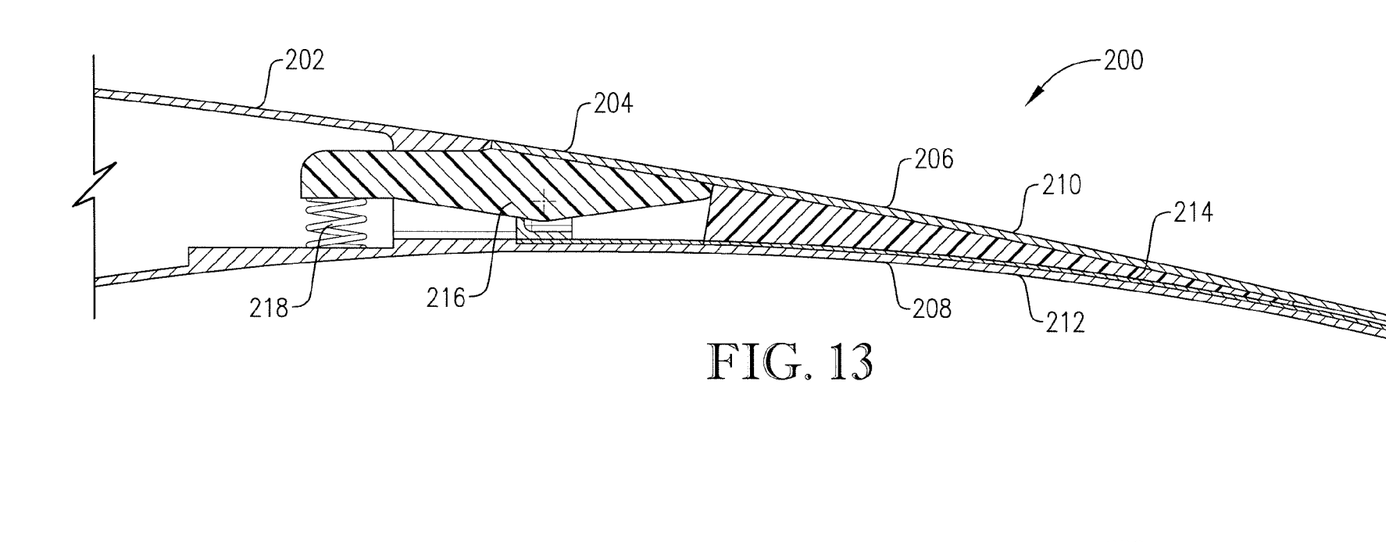
FIG. 13 is a fragmentary cross-sectional view of a ducted fan housing constructed in accordance with a second preferred embodiment of the present invention, showing a drive tile of the ducted fan housing in a nominal tile position, with the drive tile including a shape memory alloy layer.
Figure 14:
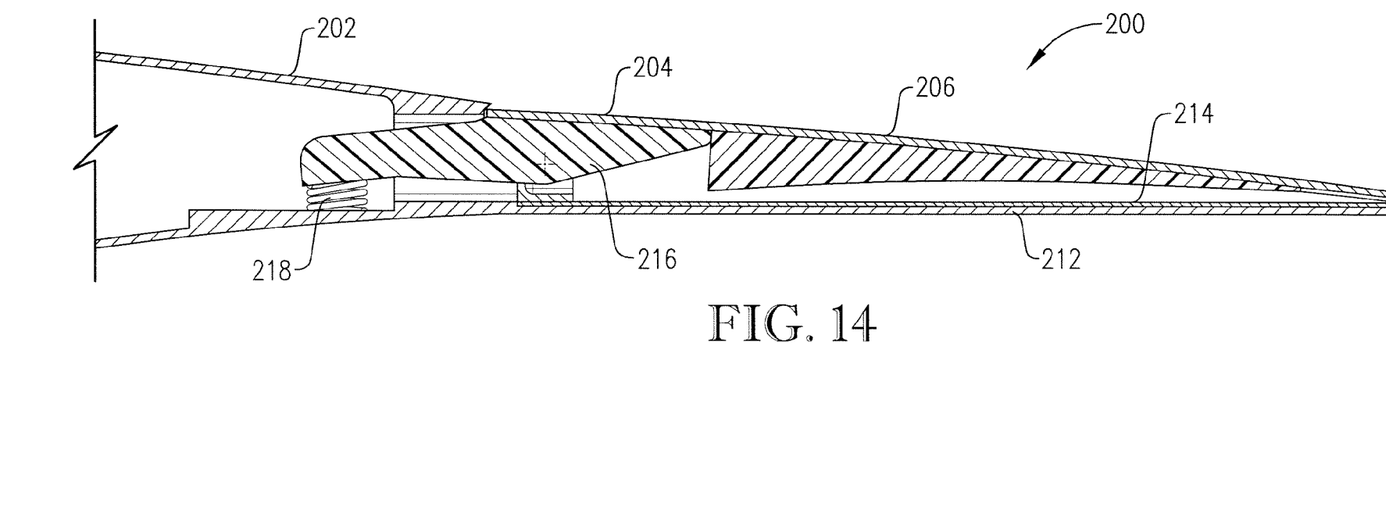
FIG. 14 is a fragmentary cross-sectional view of the ducted fan housing shown in FIG. 13, showing the drive tile in a dilated tile position.

Initially turning to FIGS. 13 and 14, an alternative ducted fan housing 200 includes an annular cowling 202 and alternative dilating fan duct nozzle sections 204. The nozzle sections 204 include, among other things, drive tiles 206 having inner and outer drive tile sections 208,210. The inner drive tile section 208 includes a body 212 that is integrally formed with the annular cowling 202. The inner drive tile section 208 also includes a shape memory alloy layer 214 attached to the body 212 with screws (not shown). The shape memory alloy layer 214 is preferably operable to shift between nominal and dilated shapes that correspond with nominal and dilated positions of the drive tiles 206. In particular, the shape memory alloy layer 214 includes shape memory alloy material that shifts the layer 214 between the shapes in response to changes in temperature. Thus, the illustrated layer 214 is configured to take the nominal shape when at a relatively cool temperature. The layer 214 is then configured to take the dilated shaped when at a relatively hot temperature. In this manner, the layer 214 is configured to shift the drive tiles 206 in response to temperature. The temperature change could be provided by various types of power sources. For instance, an electric heating element could be attached to the layer 214 and powered by the turbofan engine 20. However, another type of power source that is powered by the turbofan engine 20 could be configured to selectively heat the layer 214.

The outer drive tile sections 210 also include a tile lever 216 with an elongated lever arm. The nozzle sections 204 include a helical spring 218 positioned between a lower panel of the cowling 202 and the lever arm. The illustrated spring 218 normally urges the lever arm outwardly and thereby urges the tile sections 208,210 radially inwardly to the nominal position. As the layer 214 is heated and takes the dilated shape, the layer 214 acts to shift the tile sections 208,210 against the spring 218 and into the dilated position. As the layer 214 cools and returns to the nominal shape, the spring 21 8 acts against the layer 214 and returns the tile sections 208,210 to the nominal position.

Figure 15:
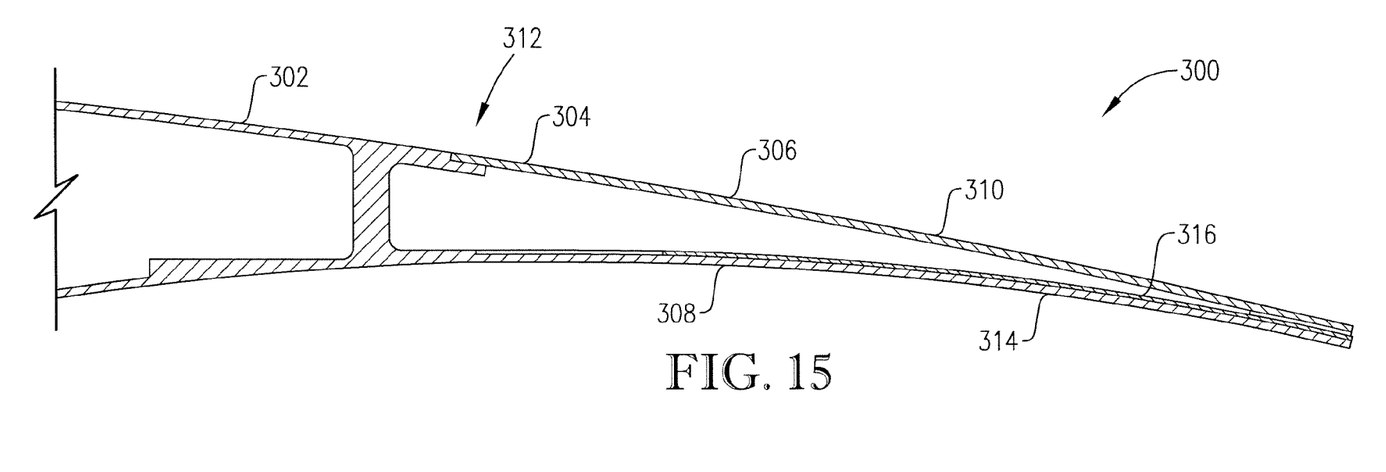
FIG. 15 is a fragmentary cross-sectional view of a ducted fan housing constructed in accordance with a third preferred embodiment of the present invention, showing a drive tile of the ducted fan housing in a nominal tile position, with the drive tile including a shape memory alloy layer.
Figure 16:
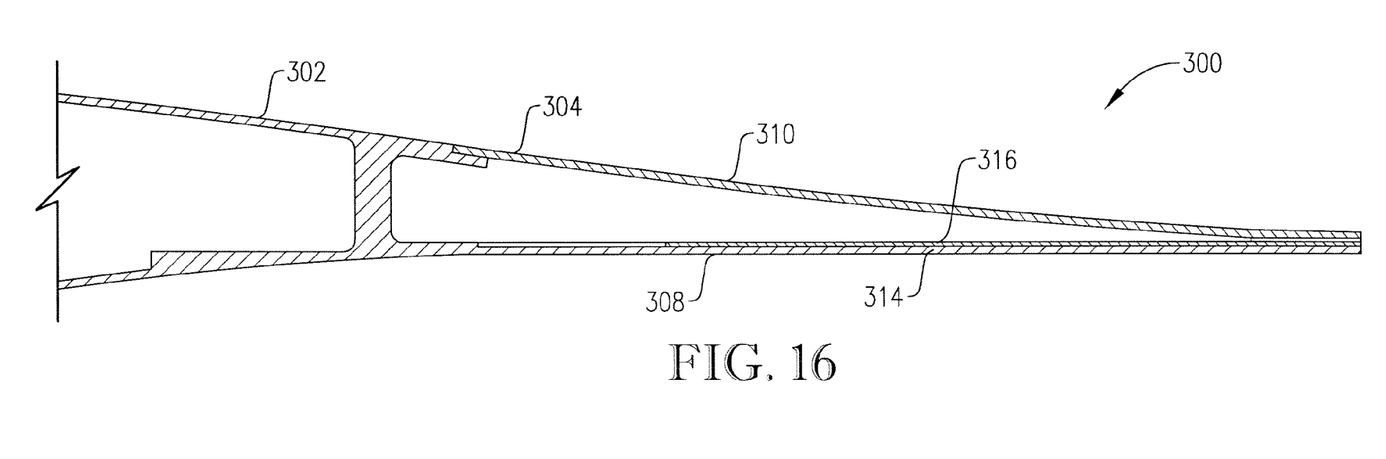
FIG. 16 is a fragmentary cross-sectional view of the ducted fan housing shown in FIG. 15, showing the drive tile in a dilated tile position.

Turning to FIGS. 15 and 16, an alternative ducted fan housing 300 includes an annular cowling 302 and alternative dilating fan duct nozzle sections 304. The nozzle sections 304 include, among other things, drive tiles 306 having inner and outer drive tile sections 308,310. The outer drive tile section 310 is substantially unitary and presents an end 312 fixed to the cowling 302, with the outer drive tile section 310 and cowling 302 forming a lap joint. The inner drive tile section 308 includes a body 314 that is integrally formed with the annular cowling 302. The inner drive tile section 308 also includes a shape memory alloy layer 316 attached to the body 314 with screws (not shown). The shape memory alloy layer 316 is operable to shift between nominal and dilated shapes that correspond with nominal and dilated positions of the drive tiles 306. In particular, the shape memory alloy layer 316 includes shape memory alloy material that shifts the layer 316 between the shapes in response to changes in temperature. As the layer 316 is heated, the layer 316 flexes the body 314 radially outwardly into the dilated position. The tile sections 308,310 are both flexible so that the outer drive tile section 310 is flexed by the body 314 and shifts with the body 314 into the dilated position. As the layer 316 is cooled, the layer 316 returns the body 314 to the nominal position, with the outer drive tile section 310 also flexing back into the nominal position.

Figure 17:
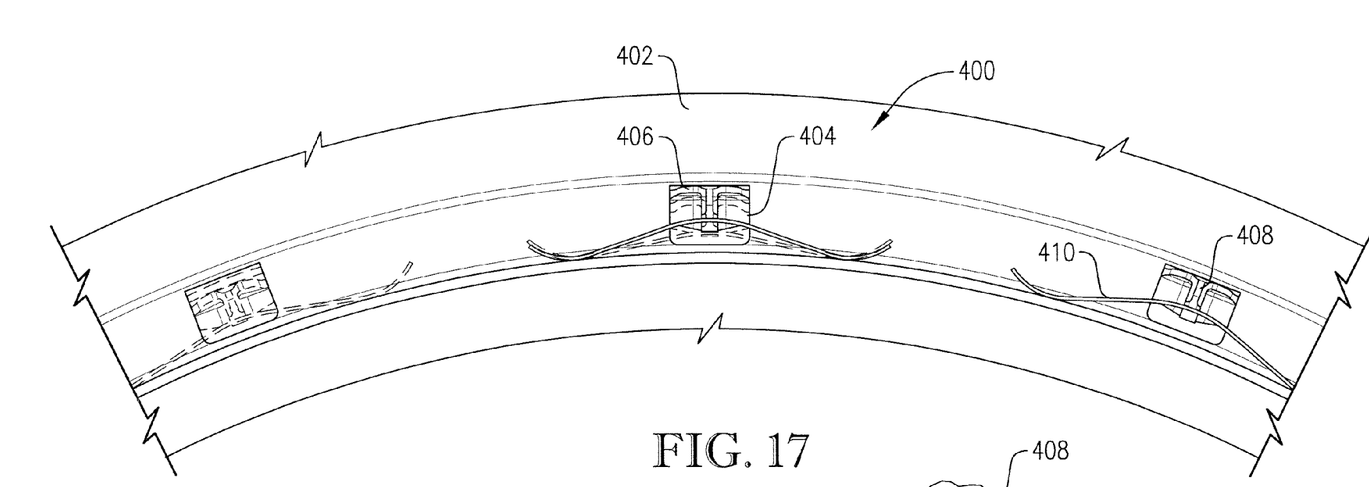
FIG. 17 is a fragmentary cross-sectional view of a ducted fan housing constructed in accordance with a fourth preferred embodiment of the present invention, showing drive tiles of the ducted fan housing in both a nominal tile position and a dilated tile position, with each drive tile being positioned by a respective shape memory alloy drive element.
Figure 18:
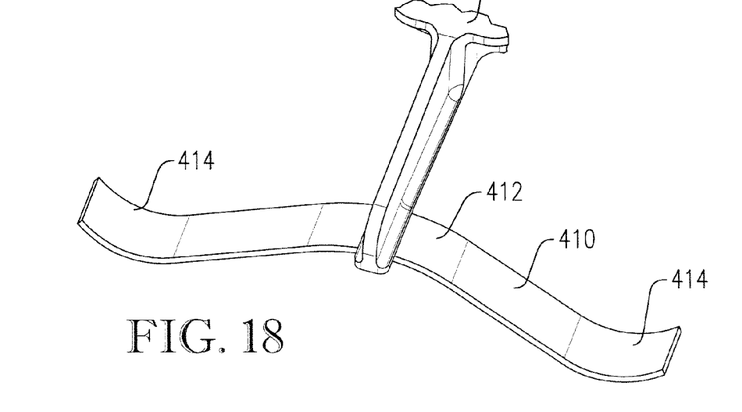
FIG. 18 is an enlarged fragmentary perspective view of the ducted fan housing shown in FIG. 17, showing a tile lever of the drive tile and the drive element.

Turning to FIGS. 17 and 18, an alternative ducted fan housing 400 includes an annular cowling 402 and alternative dilating fan duct nozzle sections 404. The nozzle sections 404 include, among other things, drive tiles 406 that include a tile lever 408. The nozzle sections 404 also include shape memory alloy springs 410. Springs 410 have an arcuate center portion 412 and arcuate ends 414. The springs 410 are shiftable between nominal and dilated shapes that correspond with nominal and dilated positions of the drive tiles 406. The springs 410 are positioned between a lower panel of the annular cowling 402 and the tile lever 408. With the spring 410 in the nominal shape, the center portion 412 is in a radially outermost position that shifts the tile lever 408 radially outwardly and correspondingly shifts the drive tile 406 in the nominal position. With the spring 410 in the dilated shape, the center portion 412 is in a radially innermost position that permits the tile lever 408 to shift radially inwardly, with the drive tile 406 being permitted to shift into the dilated position.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably lair scope of the present invention as pertains to any apparatus not materially departing from but outside the literal scope of the invention as set forth in the following claims.

What is claimed is:

1. A turbofan duct assembly operable to direct a duct flow generated by a fan in a rearward direction into ambient and operable to be powered by a power source, said turbofan duct assembly comprising:
   a fan duct presenting fore and aft ends,
   said fan duct configured to surround the fan and extend rearwardly of the fan to the aft end, with the fan duct being operable to fluidly engage the duct flow; and
   a dilating fan duct nozzle operable to fluidly engage the duct flow discharged from the fan duct,
   said dilating fan duct nozzle comprising:
      a bracket attached adjacent the aft end of the fan duct,
      and a plurality of shiftable intermeshing tiles, including a plurality of drive tiles and a plurality of driven tiles, supported by the bracket and circumferentially spaced to cooperatively form a first arcuate continuous tiled nozzle section that at least partly defines an adjustably-sized nozzle orifice, the drive tiles and the driven tiles alternating in a circumferential direction and in intermeshing engagement so that the drive tiles and the driven tiles overlap and are radially shiftable with each other, and
      a drive assembly drivingly engaged with at least one of the drive tiles and configured to be drivingly attached to the power source, operable to radially shift the tiles being between nominal and dilated configurations to adjust the nozzle orifice size and thereby control the duct flow passing through the nozzle,
      wherein the plurality of driven tiles are driven by the plurality of drive tiles,
   said shiftable intermeshing tiles being circumferentially shiftable relative to each other and remaining overlapped as the tiles shift between the configurations so that the first tiled nozzle section remains continuous as the nozzle orifice is sized.

2. The turbofan duct assembly as claimed in claim 1, said tiles forming a second arcuate continuous tiled nozzle section spaced oppositely from the first arcuate continuous tiled nozzle section, with the first and second tiled nozzle sections at least partly defining the nozzle orifice.

3. The turbofan duct assembly as claimed in claim 1, said bracket comprising a plurality of brackets, with each of the brackets being positioned relative to and supporting a corresponding drive tile.

4. The turbofan duct assembly as claimed in claim 1, said drive tile presenting a space that receives an adjacent driven tile therein.

5. The turbofan duct assembly as claimed in claim 1, said drive element comprising an axially extending tile lever that is pivotally attached to the bracket.

6. The turbofan duct assembly as claimed in claim 5, said drive assembly including a cam that drivingly engages the tile lever and is operable to be powered by the power source.

7. The turbofan duct assembly as claimed in claim 1, said tiles being radially shiftable relative to the bracket between nominal and dilated configurations, with the tiles operable to be driven between the configurations by the power source,
said tiles being shiftable between the configurations to adjust the nozzle orifice size and thereby control the duct flow passing through the nozzle,
each of said tiles being in intermeshing engagement with an adjacent tile so that each pair of adjacent intermeshing tiles overlap one another and are radially shiftable with each other,
said adjacent intermeshing tiles being circumferentially shiftable relative to each other and remaining overlapped as the tiles shift between the configurations so that the tiled nozzle section remains continuous as the nozzle orifice is sized,
said tiles each including inner and outer tile portions,
said inner tile portion operable to fluidly engage the duct flow and the outer tile portion operable to fluidly engage ambient, with the portions being shiftable relative to one another.

8. The turbofan duct assembly as claimed in claim 7, said portions cooperatively presenting an aft tile end and being in sliding contact with one another adjacent the aft tile end, with the duct flow being operable to flow into ambient adjacent the aft tile end.

9. The turbofan duct assembly as claimed in claim 8, said tiles forming a second arcuate continuous tiled nozzle section spaced oppositely from the first arcuate continuous tiled nozzle section, with the surfaces at least partly defining the nozzle orifice.

10. The turbofan duct assembly as claimed in claim 9, said dilating fan duct nozzle including a drive assembly drivingly engaged with a first tile and configured to be drivingly attached to the power source,
said drive assembly operable to radially shift the tiles between the configurations.

11. The turbofan duct assembly as claimed in claim 10, said drive assembly including a drive element attached to the first tile, with the first tile serving as a drive tile, and with a second tile being driven by the drive tile.

12. The turbofan duct assembly as claimed in claim 11, said drive and driven tiles being shiftable with each other and alternating in a circumferential direction.

13. The turbofan duct assembly as claimed in claim 12,
said drive tile portions cooperatively presenting a space that receives the inner and outer portions of adjacent driven tiles therein.

14. The turbofan duct assembly as claimed in claim 1,
said bracket comprising a plurality of brackets, with each of the brackets being positioned relative to and supporting a corresponding tile,
said tiles each including inner and outer tile portions,
said inner tile portions operable to fluidly engage the duct flow and the outer tile portions operable to fluidly engage ambient, with the portions being shiftable relative to one another,
said tile portions each presenting fore and aft tile ends, with the aft tile ends being shiftable relative to the fan duct to adjust the nozzle orifice size,
said fore tile ends of the inner tile portions each being fixed to a respective bracket,
said fore tile ends of the outer tile portions each being shiftably attached to a corresponding bracket.

15. The turbofan duct assembly as claimed in claim 14,
said inner tile portions being flexible to permit relative shifting movement of the aft tile ends.

16. The turbofan duct assembly as claimed in claim 14,
each of said outer tile portions and said corresponding brackets being pivotally attached to one another at a pivotal joint adjacent the fore tile end to permit pivotal movement of the outer tile portions relative to the corresponding brackets.

* * * * *